United States Patent
Maris

(10) Patent No.: US 8,514,103 B2
(45) Date of Patent: Aug. 20, 2013

(54) AIRFOIL PERFORMANCE MONITOR

(75) Inventor: John M. Maris, St-Bruno-de-Montarville (CA)

(73) Assignee: Marinvent Corporation, St-Bruno-de-Montarville, Quebec (CA)

( * ) Notice: Subject to any disclaimer, the term of this patent is extended or adjusted under 35 U.S.C. 154(b) by 325 days.

(21) Appl. No.: 13/112,515

(22) Filed: May 20, 2011

(65) Prior Publication Data

US 2011/0285550 A1  Nov. 24, 2011

Related U.S. Application Data

(60) Provisional application No. 61/346,945, filed on May 21, 2010.

(51) Int. Cl.
- *G08B 23/00* (2006.01)
- *B64C 23/06* (2006.01)
- *G01M 9/00* (2006.01)

(52) U.S. Cl.
USPC ............. 340/966; 340/963; 244/200; 73/147

(58) Field of Classification Search
USPC ................ 340/963, 964, 966, 968; 244/200, 244/200.1, 203, 212, 214; 73/147, 180; 415/145, 220
See application file for complete search history.

(56) References Cited

U.S. PATENT DOCUMENTS

| | | | |
|---|---|---|---|
| 2,431,241 A | 11/1947 | Godsey | |
| 2,596,116 A | 5/1952 | Bamber | |
| 2,603,695 A | 7/1952 | Campbell | |
| 2,638,579 A | 5/1953 | Dyche et al. | |
| 2,748,372 A | 5/1956 | Bunds | |
| 3,079,105 A | 2/1963 | Raspet | |
| 3,426,322 A | 2/1969 | Balo | |
| 3,868,625 A | 2/1975 | Speigner et al. | |
| 4,061,029 A | 12/1977 | Fletcher et al. | |
| 4,188,823 A | 2/1980 | Hood | |
| 4,229,725 A | 10/1980 | Reilly | |
| 4,235,104 A * | 11/1980 | Hoadley et al. | 73/180 |
| 4,435,695 A | 3/1984 | Maris | |
| 4,563,684 A | 1/1986 | Maris | |
| 4,618,856 A | 10/1986 | Antonazzi | |
| 4,649,387 A | 3/1987 | Maris | |
| 4,727,751 A | 3/1988 | Holmes et al. | |
| 5,341,677 A | 8/1994 | Maris | |
| 5,598,990 A * | 2/1997 | Farokhi et al. | 244/200.1 |
| 5,681,145 A * | 10/1997 | Neely et al. | 416/203 |
| 6,098,923 A * | 8/2000 | Peters, Jr. | 244/45 R |
| 6,789,769 B2 * | 9/2004 | Mau et al. | 244/214 |
| 7,887,287 B2 * | 2/2011 | Yanagi et al. | 415/145 |

FOREIGN PATENT DOCUMENTS

| | | |
|---|---|---|
| CA | 1210504 | 8/1986 |
| GB | 2066194 | 7/1983 |

* cited by examiner

*Primary Examiner* — Van T. Trieu

(74) *Attorney, Agent, or Firm* — Norton Rose Fulbright Canada LLP

(57) ABSTRACT

There is described a method for generating a parameter for airfoil performance monitoring, the method comprising: receiving at least a first signal indicative of a first airflow parameter measured at one of an aft position and a side-facing position of a sensor mast mounted to an airfoil and at least a second signal indicative of a second airflow parameter measured at a fore position of the sensor mast; generating a turbulence intensity ratio for each one of the first airflow parameter and the second airflow parameter; and combining the turbulence intensity ratio of the first airflow parameter and the turbulence intensity ratio of the second airflow parameter to generate a combined turbulence intensity ratio for airfoil performance monitoring.

20 Claims, 10 Drawing Sheets

AIRFOIL PERFORMANCE MONITOR

CROSS-REFERENCE TO RELATED APPLICATIONS

The present application claims priority under 35 USC §119(e) on U.S. Provisional Patent Application Ser. No. 61/346,945 filed on May 21, 2010, the entire content of which is incorporated herein by reference.

TECHNICAL FIELD

The present invention relates to the field of aerodynamic performance monitoring and more particularly, to the monitoring of airflow for airfoil phenomena.

BACKGROUND

An airfoil is a part or surface, such as a wing, propeller blade, or rudder, whose shape and orientation control stability, direction, lift, thrust, or propulsion. Airflow immediately adjacent to, and influenced by, the airfoil is called the boundary layer. Airflow at the base of the boundary layer is in contact with the airfoil and not moving relative to it. By convention, the "top" of the boundary layer is the outer limit, not literally its "top" as opposed to "bottom". The airflow gradually increases in speed until it reaches the free-stream velocity at the limit of the boundary layer. The boundary layer can be laminar (smooth) or turbulent. Laminar flow is generally limited to the forward portions of an airfoil surface, with the subsequent transition to a turbulent boundary layer occurring as a function of the flow's Reynolds Number (Re).

Various transducer devices measure the air velocity or air speed by constant temperature hot wire probes, or solid-state pressure sensors or others, and these devices generate an electrical signal as a function of the locally-sensed airflow velocity. The electrical signal (current, voltage, impedance, or resistance, depending on the system) has a steady-state component corresponding to average airflow speed and an overlaid oscillatory component corresponding to turbulence level. For ease of reference, these are referred to as DC and AC components, respectively, hereafter. The DC and AC components are electrically separated, then converted from analog to digital form separately by an analog to digital converter. These digital outputs are usually not linear functions of the sensed air velocities, and require further processing to linearize them before a comparison is performed between the AC and DC signals to produce a dimensionless Turbulence Intensity Ratio "R" which can be calibrated against actual performance at any suitable location on any given aircraft to provide a stall warning or investigatory system.

Such devices have performed successfully during extensive flight trials on numerous aircraft types, but they have exhibited one serious shortcoming: they fail to respond to severely separated airflow, in which the airflow proceeds from the back part of the airfoil to the front ("reverse flow"). Airfoils often exhibit reversed airflow near the stall and post-stall angles-of-attack. Areas of reversed flow are not registered by the equipment, resulting in an unusable or zero "R" values. The same may happen with distorted airflow at high sideslip angles.

In addition, it has also been observed that the use of a fixed R value can lead to a premature stall warning condition in the case of severe airfoil roughness, as might be caused by certain types of icing. The roughness causes a marked increase in the unsteady airflow component, which increases the R value and biases the stall warning level.

Therefore, there is a need to improve aerodynamic performance monitoring for airfoils.

SUMMARY

Direct measure of actual airflow characteristics on the airfoil may be used for airfoil performance monitoring. An advisory system to aid in recognition of impending airfoil stall (main wing, fin, or tail, for example) may be complementary to stall warning/protection systems, ice detectors, Angle-of-Attack (AoA) sensors, anti-ice de-icing systems, and normal Flight In Known Icing ("FIKI") procedures. It may also be complementary to a "clean wing" concept and a low speed awareness system.

The system described herein provides a plurality of pressure or velocity sensors mounted on a sensor mast oriented to detect flow from at least one of behind and the sides of the sensor mast, in addition to the forward-facing sensors. A turbulence intensity ratio R value is computed independently for each sensor, and the resultant R values are mathematically or electrically combined to produce a combined Turbulence Intensity Ratio or composite R' value that does not drop to zero when reverse or side flow is experienced. The mathematical operation can be a summation, Root-Mean-Square (RMS) combination, or via a similar method that combines the two values to overcome the singularities previously caused by reverse and/or side flow.

The system may act as an aural and/or visual device in a cockpit to advise/warn aircrews of stall margins on abnormal situations and/or wing/tail contaminations (ice, bugs, etc). It may act as an indication of contamination on a takeoff roll, which means it can warn of contaminated surfaces before being airborne. It may provide instant, real-time correct margin to stall.

In accordance with a first broad aspect, there is provided a method for generating a parameter for airfoil performance monitoring, the method comprising: receiving at least a first signal indicative of a first airflow parameter measured at one of an aft position and a side-facing position of a sensor mast mounted to an airfoil and at least a second signal indicative of a second airflow parameter measured at a fore position of the sensor mast; generating a turbulence intensity ratio for each one of the first airflow parameter and the second airflow parameter; and combining the turbulence intensity ratio of the first airflow parameter and the turbulence intensity ratio of the second airflow parameter to generate a combined turbulence intensity ratio for airfoil performance monitoring.

In accordance with a second broad aspect, there is provided a system for airfoil performance monitoring comprising: a processing module for receiving at least a first signal indicative of a first airflow parameter measured at one of an aft position and a side-facing position of a sensor mast mounted to an airfoil and at least a second signal indicative of a second airflow parameter measured at a fore position of the sensor mast, and generating a turbulence intensity ratio for each one of the first airflow parameter and the second airflow parameter; and a combination module for combining the turbulence intensity ratio of the first airflow parameter and the turbulence intensity ratio of the second airflow parameter to generate a combined turbulence intensity ratio for airfoil performance monitoring.

The system presented herein may also provide additional processing to determine the slope of the variation of the combined turbulence intensity ratio R' as a function of a normalizing parameter such as the AoA, time, or the DC signal component of the forward-facing sensor. In one embodiment, the slope is obtained by dividing the combined turbulence intensity ratio R' value by the AoA, thereby obtaining a "normalized" R/AoA value which substantially corresponds to the desired slope. By comparing it to a threshold, the "normalized" R/AoA value can be used as the critical parameter for driving flight-deck displays and warnings. Where AoA is unavailable, the derivative of the combined turbulence intensity ratio R' with respect to time may be used instead. In another variation, the combined turbulence intensity ratio R' can be normalized by the DC component of the forward-facing sensor, as the latter correlates to the AoA except near the stall. In each of these cases, the system output would be based on the normalized combined turbulence intensity ratio' obtained by dividing the combined turbulence intensity ratio R' value by the normalizing parameter.

In the present specification, it should be understood that while pressure sensors are used to obtain pressure measurements, velocity sensors may also be used in an analogous manner and are thus interchangeable with the expression "pressure sensors". In addition, the aerodynamics illustrated is equally applicable to hydro-dynamics without departing from the scope of the present invention.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
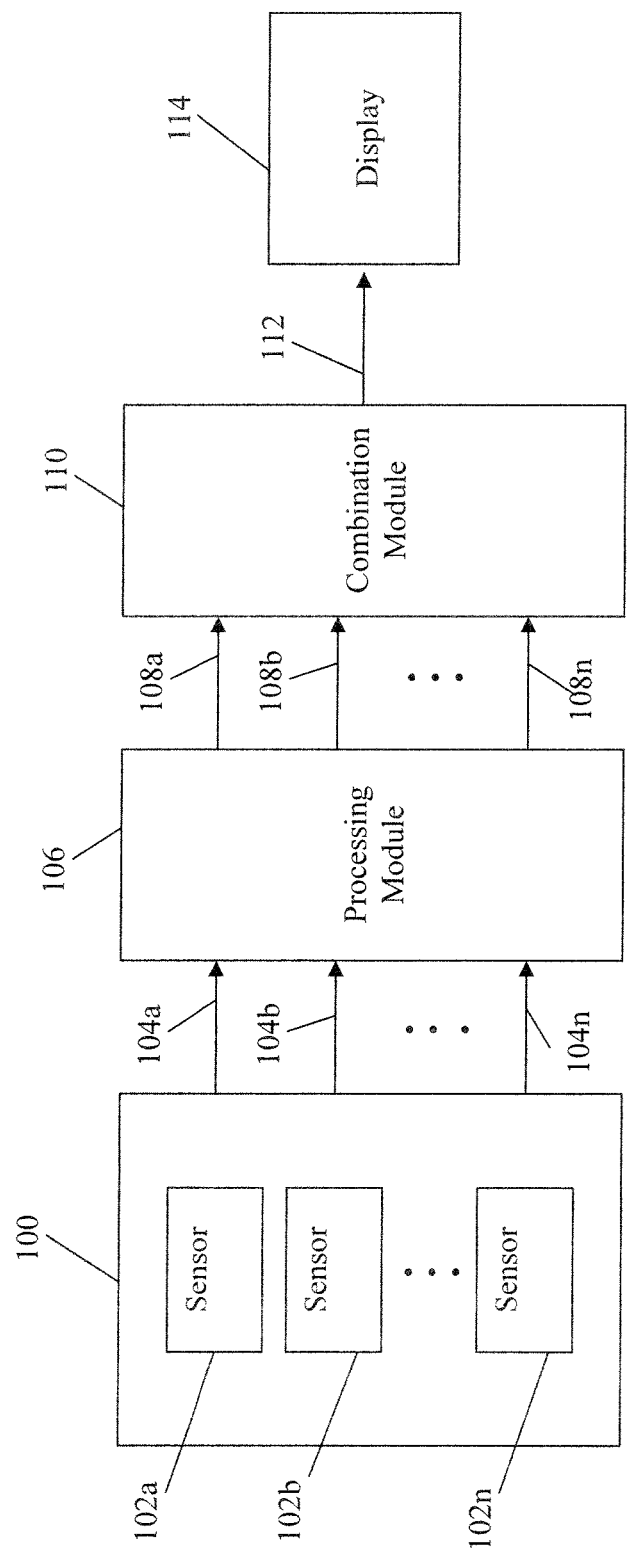
FIG. 1 is a block diagram of a system for airfoil performance monitoring, in accordance with one embodiment.

The basic principles underlying the airfoil performance monitor involve the measurement of an airflow parameter, such as the local airflow velocity or the local pressure, at a predetermined location adjacent to the suction surface of an airfoil. This airflow measurement signal is decomposed into a fluctuating component and a steady-state (mean) component. The fluctuating component of the signal is divided by the steady-state component to produce a dimensionless turbulence intensity ratio R.

A turbulence intensity ratio R value is obtained for at least a first airflow parameter value measured at the forward face of a sensor mast attached substantially perpendicularly to an airfoil such as a an aircraft wing, and a second airflow parameter value measured at the aft or on one side of the sensor mast. The at least two R values are combined together to obtain a composite or combined turbulence intensity ratio R' value. The combining method is chosen so that the resulting composite R value cannot be equal to zero.

Extensive experimentation has demonstrated an excellent correlation between the slope of the combined turbulence intensity ratio R' curve as a function of a normalizing parameter and the proximity of the airfoil to a stalled condition, regardless of factors which spoil the calibration of conventional systems, such as airfoil contamination or roughness, for example. Therefore, when the slope of the combined turbulence intensity ratio R' value increases reaches a threshold, one can conclude that the airfoil is substantially in a stalled condition or close to the stall condition, and an alarm may be output.

The present system provides a plurality of pressure or velocity sensors oriented to detect flow from behind and/or from the sides of the sensor mast, in addition to the forward-facing sensors already present. The turbulence intensity ratio R value is computed independently for each sensor, and the resultant R values are mathematically or electrically combined to produce a combined turbulence intensity ratio R' that does not drop to zero when reverse or side flow is experienced. The mathematical operation can be a summation, Root-Mean-Square (RMS) combination, modulus (absolute value) calculation, or obtained via a similar method that combines the different turbulence intensity ratio R values to overcome the singularities previously caused by reverse/side-flow.

The combined turbulence intensity ratio R' is converted into a digital or analog electrical format suitable for alerting a user. For example, the combined turbulence intensity ratio R' value may be displayed on a dedicated indicator or on traditional Angle-of-attack (AoA) indicators, indexer lights, or AoA tone generators, The digital or analog electrical format may also be suitable to activate other stall warning devices such as stick shakers and pushers, as would post-processing of the converted combined turbulence intensity ratio R' value.

One embodiment includes measuring the real-time pressure of the airflow using one or more mast-mounted pressure transducers to produce an output signal. The output for each pressure transducer comprises a steady state component corresponding to the mean dynamic pressure of the local airflow, and an overlaid ripple component corresponding to the turbulent component of the local airflow. The output signal is analog in nature and may comprise varying voltage, resistance, impedance, or current flow depending on the type of transducer and amplifier employed. The output signal is then transformed from an analog signal to a digital signal, which is then separated into steady state and overlaid ripple components, which may also be scaled at this point.

A dedicated digital processor or a computer using appropriate software may then be used. The digital ripple component may be transformed into an amplitude equivalent, which may desirably correspond to the root mean square value of the ripple component. The amplitude equivalent of the ripple component and the steady state component are expressed as a dimensionless ratio by dividing the amplitude equivalent of the ripple component by the steady-state component in order to produce a pressure turbulence intensity ratio R, for each pressure transducer. The processor or the software is further configured for combining the different R values for the pressure transducers together to obtain a combined turbulence intensity ratio R' which cannot be equal to zero.

Alternatively, the analog output signal is electrically separated into steady state and overlaid ripple components. High-pass and low-pass filters can be used to separate the components that may also be scaled at this point. The steady state component is then a direct current (DC) component, while the overlaid ripple component is an alternate current (AC) component. The overlaid ripple component can be transformed into an amplitude equivalent, generally the root mean square (RMS) DC equivalent of the AC ripple. The amplitude equivalent of the overlaid ripple component and the steady state component are expressed as a dimensionless ratio by dividing the amplitude equivalent by the steady-state component to produce a pressure turbulence intensity ratio R, for each pressure transducer. The analog output signal may be amplified. Then the different R values for the different pressure transducers are electrically combined together using an adequate electrical circuit in order to obtain a combined turbulence intensity ratio R' value that cannot be equal to zero.

It should be understood that each operation required to obtain the combined turbulence intensity ratio R', such as the decomposition of the measurement signal into a steady-state and overlaid ripple components, the R value determination, and the combined R' value determination for example, can be either electrically performed by an adequate electrical circuit which receives and outputs analog signals or digitally performed by a processing unit. If at least one operation is digitally performed, an analog to digital converter is used for providing digital signals to the processing unit performing the digital operation.

In one embodiment, the combined turbulence intensity ratio R' value is presented to a user by conventional means, including but not limited to AoA indicators, indexer lights, AoA tone generators, stick shakers and pushers, over-speed warnings, and the like.

Additional levels of processing can be employed to enhance signal quality. For example spurious signals, generated by propellers, airframe interactions, or aircraft electrical equipment can be eliminated by notch filters tuned to the undesirable characteristic frequencies. System response can be optimized through lead and lag filtering (rate anticipation and time averaging respectively). Finally, the R value can be determined using linear, logarithmic or exponential functions, with logical constraints as required.

In one embodiment, additional processing includes determining in substantially real-time the slope of the combined R' curve vs. an adequate normalizing parameter such as the angle-of-attack for example, and using the slope value as the critical parameter for driving flight-deck displays, warnings, and other devices. Where AoA is unavailable, the derivative of the combined R' with respect to time may be used instead, i.e. the slope of the combined R' curve vs. time. In another embodiment, the derivative of the combined R' with respect to a DC component of the fore sensor may be used, as the latter is substantially proportional to the AoA. In one embodiment, the slope of the combined R' is obtained by dividing the combined R' value by the normalizing parameter.

Figure 2:
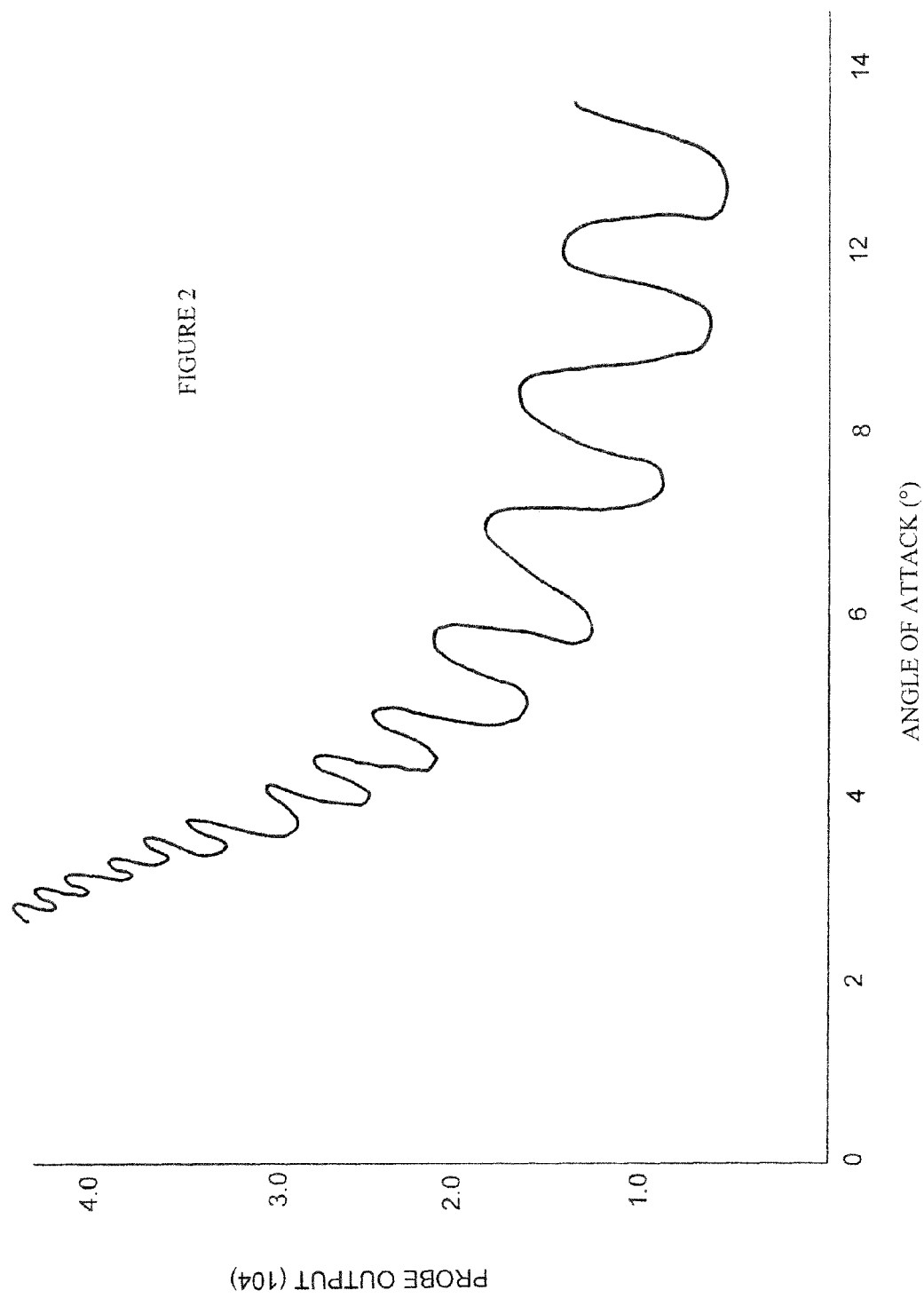
FIG. 2 is a graph illustrating an exemplary curve for a probe output vs. a changing angle of attack.

FIG. 1 illustrates a system for generating a parameter to be used for airfoil performance monitoring. The system comprises a measuring device 100 to measure an airflow parameter such as pressure or velocity in real-time at a predetermined location above the surface of the airfoil. At least two sensors 102a, 102b, . . . , 102n are provided on a sensor mast to sense the airflow parameter to be measured. The sensor mast is mounted to an airfoil at any adequate position. At least one of the sensors 102a, 102b, . . . , 102n is provided in a fore position of the sensor mast and at least one sensor 102a, 102b, . . . , 102n is provided in an aft or side-facing position of the sensor mast. At least two output signals 104a, 104b, . . . , 104n, corresponding to the measured airflow parameter signals from the fore and aft/side-facing directions are produced. Each measured signal is a probe output and represents a voltage, current, impedance, or resistance. FIG. 2 illustrates an exemplary probe output versus a changing angle of attack.

Figure 3:
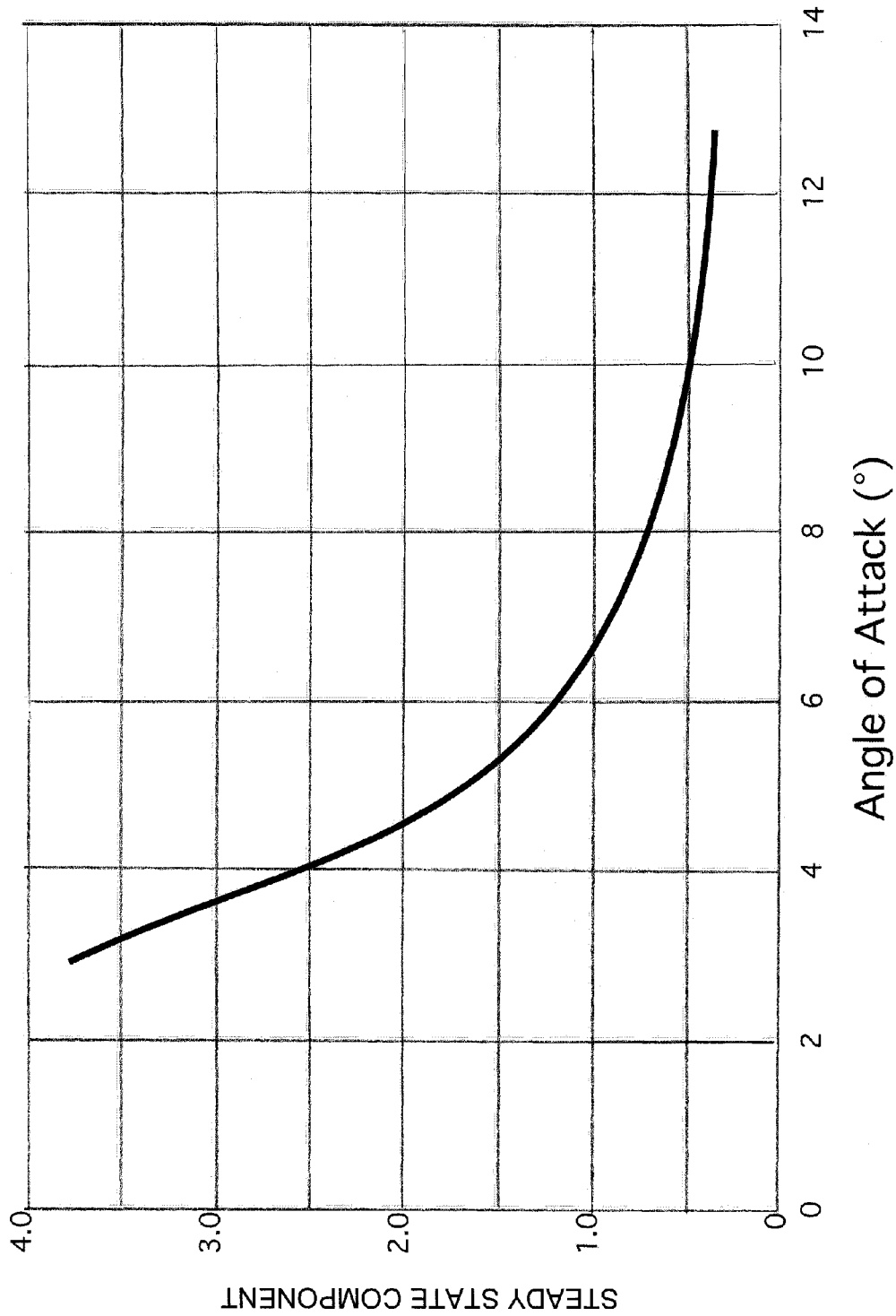
FIG. 3 is a graph illustrating an exemplary curve for the DC component of the curve of FIG. 2 vs. the changing angle of attack.
Figure 4:
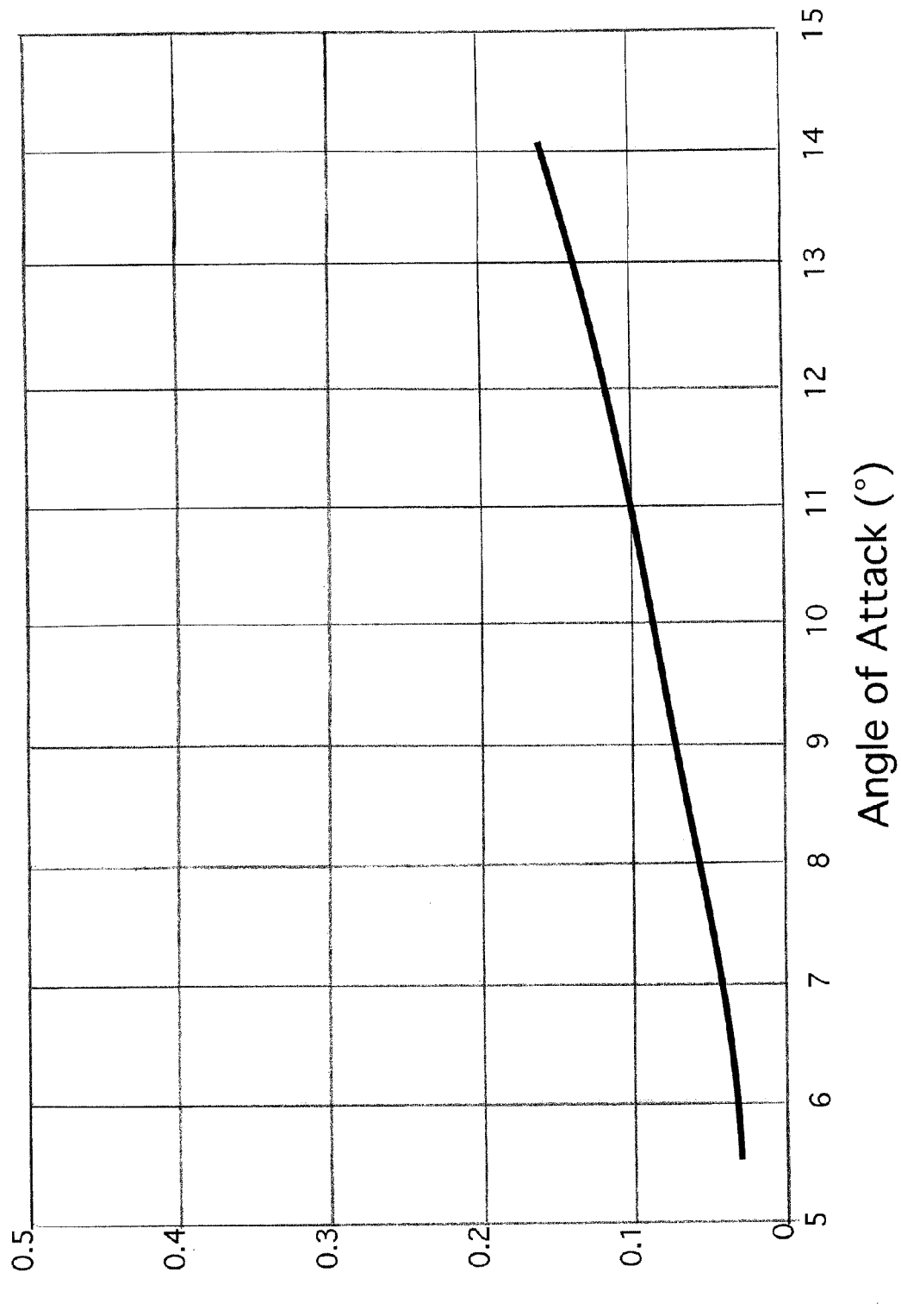
FIG. 4 is a graph illustrating an exemplary curve for the AC component of the curve of FIG. 2 vs. the changing angle of attack.

A processing module 106 receives the measured output signals 104a, 104b, . . . , 104n, and separates each signal into steady state and overlaid ripple components. The steady state (or DC) component is illustrated in an exemplary manner in FIG. 3, vs. the changing angle of attack. The overlaid ripple component (or AC) is illustrated in an exemplary manner is FIG. 4, vs. the changing angle of attack. As can be seen from FIG. 3, the average of the output voltage (or DC component) decreases as the AoA increases, while FIG. 4 shows that the overlaid ripple component value increases with AoA.

In one embodiment, the ripple component is transformed into an amplitude equivalent, which may desirably correspond to the root mean square value of the ripple component.

The processing module 106 may then derive a dimensionless ratio of the overlaid ripple component and the steady state component to produce a pressure turbulence intensity ratio R 108a, 108b, . . . , 108n for each airflow parameter measurement performed by the sensors 102a, 102b, . . . , 102n. In one embodiment, the R value is obtained by dividing the overlaid ripple component by the steady state component.

In another embodiment, the processing module 106 transforms the real-time overlaid ripple component of the signal into an amplitude equivalent which is then divided by the steady-state component to provide the turbulence intensity ratio $R_a$, $R_b$, . . . , $R_n$, for each one of the sensors 102a, 102b, . . . , 102n. A method and system for obtaining a pressure turbulence intensity factor R for a single pressure measurement is also described in U.S. Pat. No. 5,341,677, the contents of which are hereby incorporated by reference.

A combination module 110 combines the turbulence intensity ratios R from at least the fore and aft or side sensors and generates a combined turbulence intensity ratio R' 112 as its output. As stated above, adequate mathematical operations are applied to obtain a combined turbulence intensity ratio R' that does not drop to zero when reverse and/or side flow is experienced. Then, the combination module 110 may output the determined combined R' value.

The combination module 110 may sum up the turbulence intensity ratios R to generate the combined R', which is equal to $(R_a + R_b \ldots R_n)$. In another example, the combination module 110 sums up the absolute values of the turbulence intensity ratios R to generate the combined R', which is equal to $(abs(R_a) + abs(R_b) + \ldots + abs(R_n))$. Another generalized example of an adequate operation for combining the R values from n sensors to provide a non-zero combined R' value is: $(R_a^2 + R_b^2 + \ldots + R_n^2)^{1/2}$.

Figure 5:
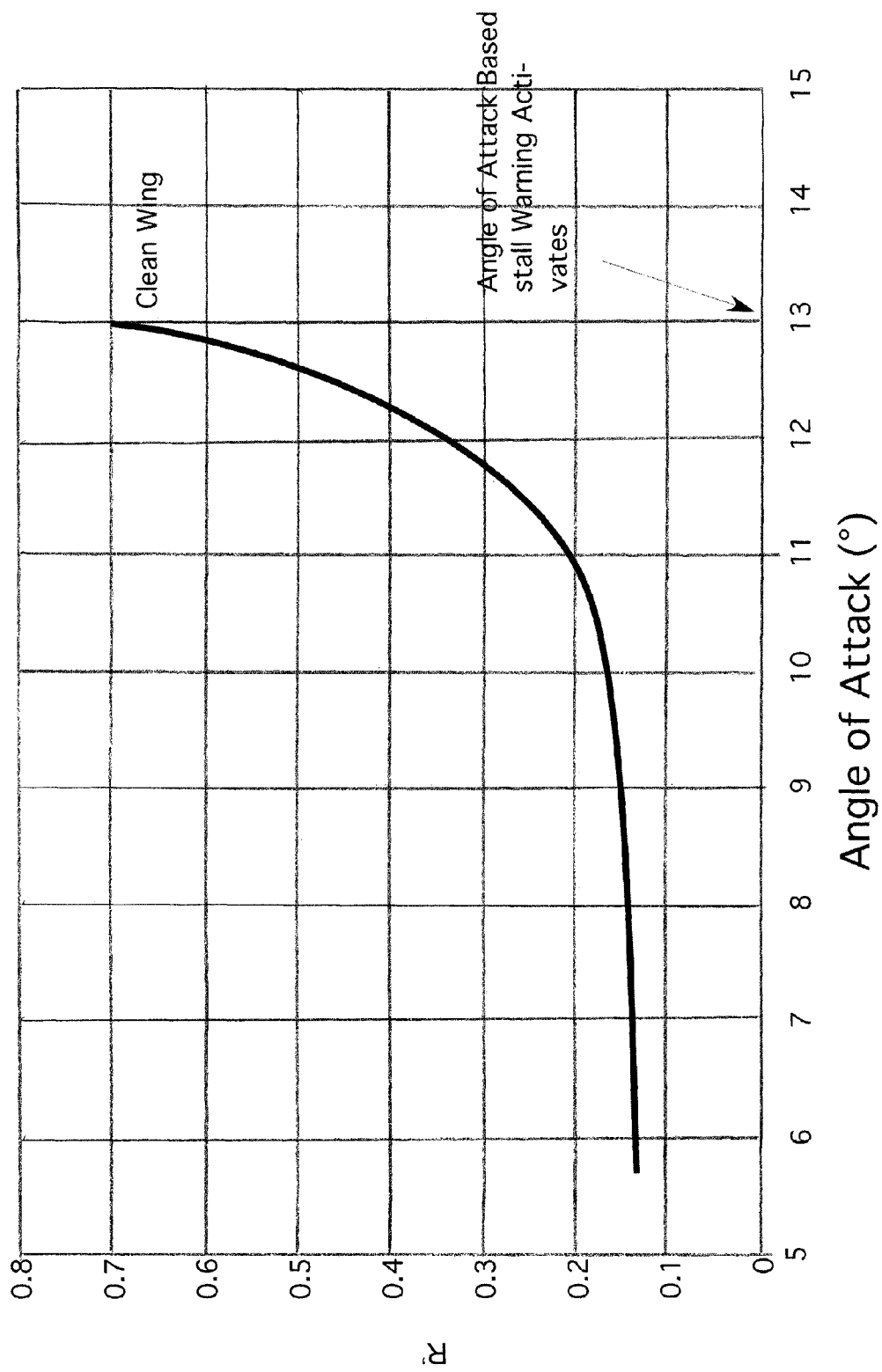
FIG. 5 is a graph illustrating an exemplary curve for the combined turbulence intensity ratio R as a function of an Angle-of-Attack, in accordance with an embodiment.

FIG. 5 shows an example of a combined turbulence intensity ratio R obtained by combining at least two dimensionless R values derived from the transformed digitalized overlaid ripple components divided by their respective digitalized steady-state component plotted against angle of attack for each of the output signals 104a, 104b, . . . , 104n. As illustrated in FIG. 5, for the example clean wing, the stall warning would activate at approximately 13° AoA.

Figure 6:
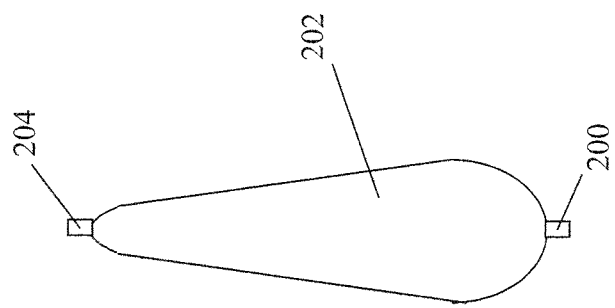
FIG. 6 schematically illustrates an airfoil-shaped sensor-mast provided with a fore pressure sensor and an aft pressure sensor, in accordance with an embodiment.

For example, the system may comprise a first pressure sensor 200 for measuring in substantially real-time the airflow pressure at the fore of a sensor mast 202 and a second sensor 204 for measuring in substantially real-time the airflow pressure at the aft of the sensor mast 202 as illustrated in FIG. 6. The measurements by the two sensors 200 and 204 are performed substantially concurrently. A first R value, i.e. $R_1$, is determined using the pressure measured by the first sensor 200 at a time t, and a second R value, i.e. $R_2$, is determined using the pressure measured by the second sensor 204 at substantially the same time t. In one embodiment, the combination module 110 generates a combined R' value by summing the two R values $R_1$ and $R_2$. Since the $R_2$ cannot be equal to zero if $R_1$ is equal to zero, and vice versa, the sum of the two R values cannot be equal to zero.

In another example, the combination module uses a root-mean-square calculation to generate a non-zero combined R', which is equal to: $(R_1^2+R_2^2)^{1/2}$.

It should be understood that the pressure sensor 204 may be positioned on one side of the sensor mast 200. Alternatively, the sensor mast 202 may be provided with at least one pressure sensor positioned at the fore of the sensor mast, at least one pressure sensor at the aft of the sensor mast, at least one pressure sensor at one side of the sensor mast, and/or at least one pressure sensor at the other side of the sensor mast. It should also be understood that the pressure sensors may be replaced by velocity sensors for measuring the air velocity. In this case, the processing module 106 is adapted to determine the ratios R using the air velocity measurements.

In one embodiment, the combination module 110 outputs the combined R' value to a conventional presentation device 114 and the signal 112 is indicative of the combined R' value. The device 114 may be an AoA indicator, an indexer light, an AoA tone generator, a stick shaker and pusher, an over-speed warning, or the like. In the same or an alternate embodiment, the combination module 110 compares the determined combined turbulence intensity ratio R' value to a threshold, and outputs a stall warning signal to be presented to the user when the combined turbulence intensity ratio R' value exceeds the threshold.

In the same or another embodiment, the combination module 110 is further configured for determining the slope of the combined R curve versus an adequate normalizing parameter. As described above the normalizing parameter may be the AoA, time, any other parameter proportional to the AoA, a steady-state component, a steady-state component squared, a steady-state component cubed, or the like. The slope value may be outputted by the combination module 110 to be presented to the user using the conventional presentation device 114 along with the combined R' value. Alternatively, only the slope of the combined R' may be sent to the presentation device 114.

In one embodiment, the combination module 110 is further configured for comparing the determined slope for the combined R' to a slope threshold. When the determined slope exceeds the threshold, the combination module 110 outputs a stall warning signal. The warning signal may be sent to the presentation device 114 which informs the user that a stall condition has been met.

Referring back to the previous example in which the combined R' value is determined by combining R1 and R2, the combination module determines the slope of the variation of the combined R' as a function of a normalizing parameter, which corresponds to the variation rate of the combined R'. For example, the normalizing parameter can be the AoA. In one embodiment, the slope is obtained by dividing the combined R' value obtained using the pressure measurements performed at time t by the corresponding AoA for time t. In another embodiment, the slope is obtained by dividing a variation of the combined turbulence intensity ratio $\Delta R'$ by a corresponding AoA variation $\Delta AoA$. As described above, other adequate normalizing parameter may be used for determining the slope. For example, the combined R' value may be divided by the time t or the variation of combined turbulence intensity ratio $\Delta R'$ may be divided by a corresponding time variation $\Delta t$.

In one embodiment, a mast-mounted measuring device 100 measures a parameter in real-time at a predetermined location spaced from the airfoil, and produces at least two output signals corresponding to the voltage. The output signals are converted from analog to digital in the processing module 106, where the digital signals are separated into steady state and overlaid ripple components. The overlaid ripple component is transformed into an amplitude equivalent and a dimensionless ratio R is derived of the amplitude equivalent over the overlaid ripple component and the steady state component to produce a pressure turbulence intensity ratio.

Figure 7:
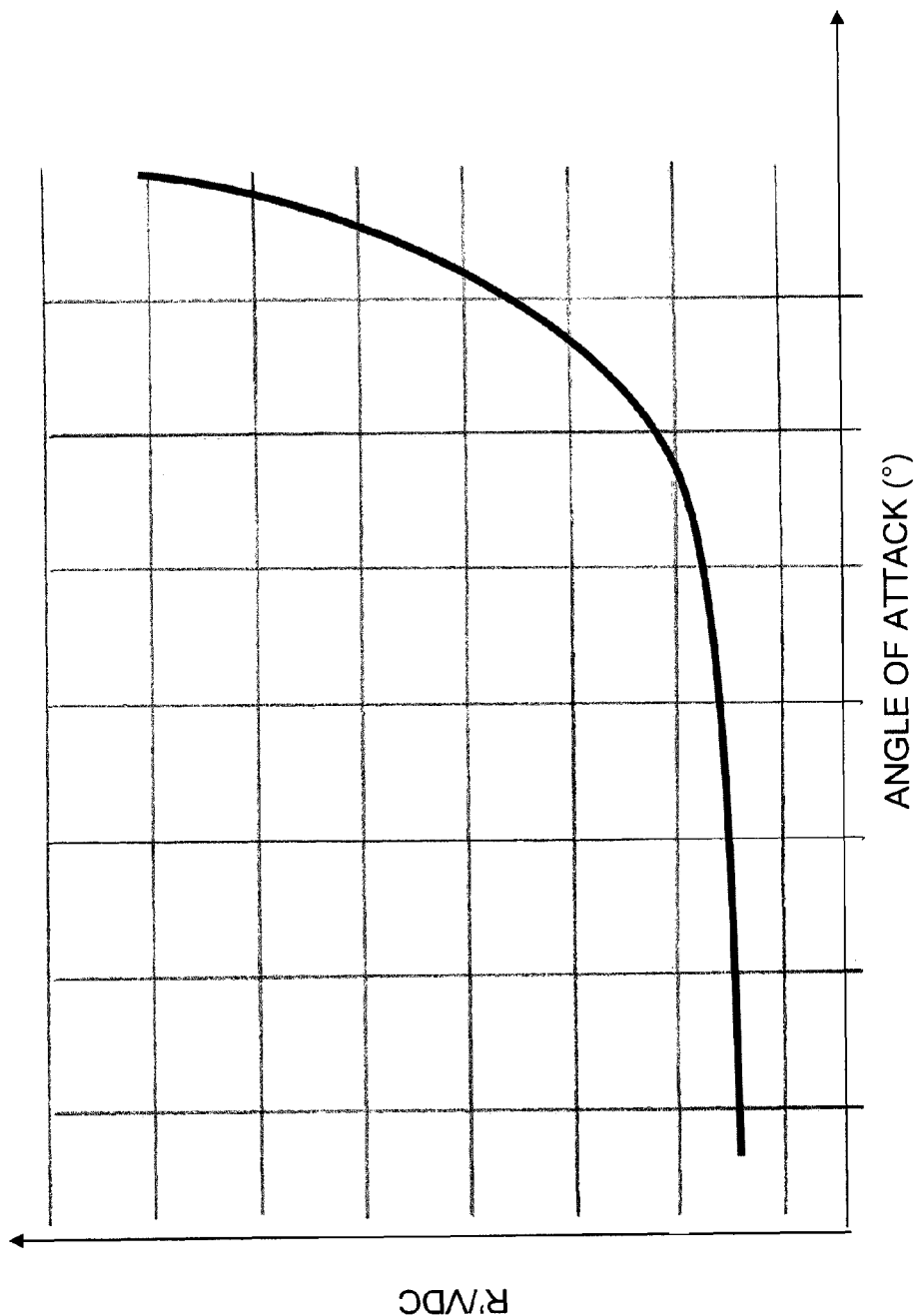
FIG. 7 is a graph illustrating an exemplary rate of variation of the combined turbulence intensity ratio R as a function of an angle-of-attack.

FIG. 7 illustrates graphically an example of a relationship between the rate of change of a combined turbulence intensity ratio R' in DC volts vs. the AoA. In one embodiment, the stall warning may be activated based on a change of slope instead of based on a given combined R' value. As illustrated in FIG. 7, the slope changes drastically at a given point in the curve, and this change may be used to define the slope threshold and trigger the stall warning.

Figure 8:
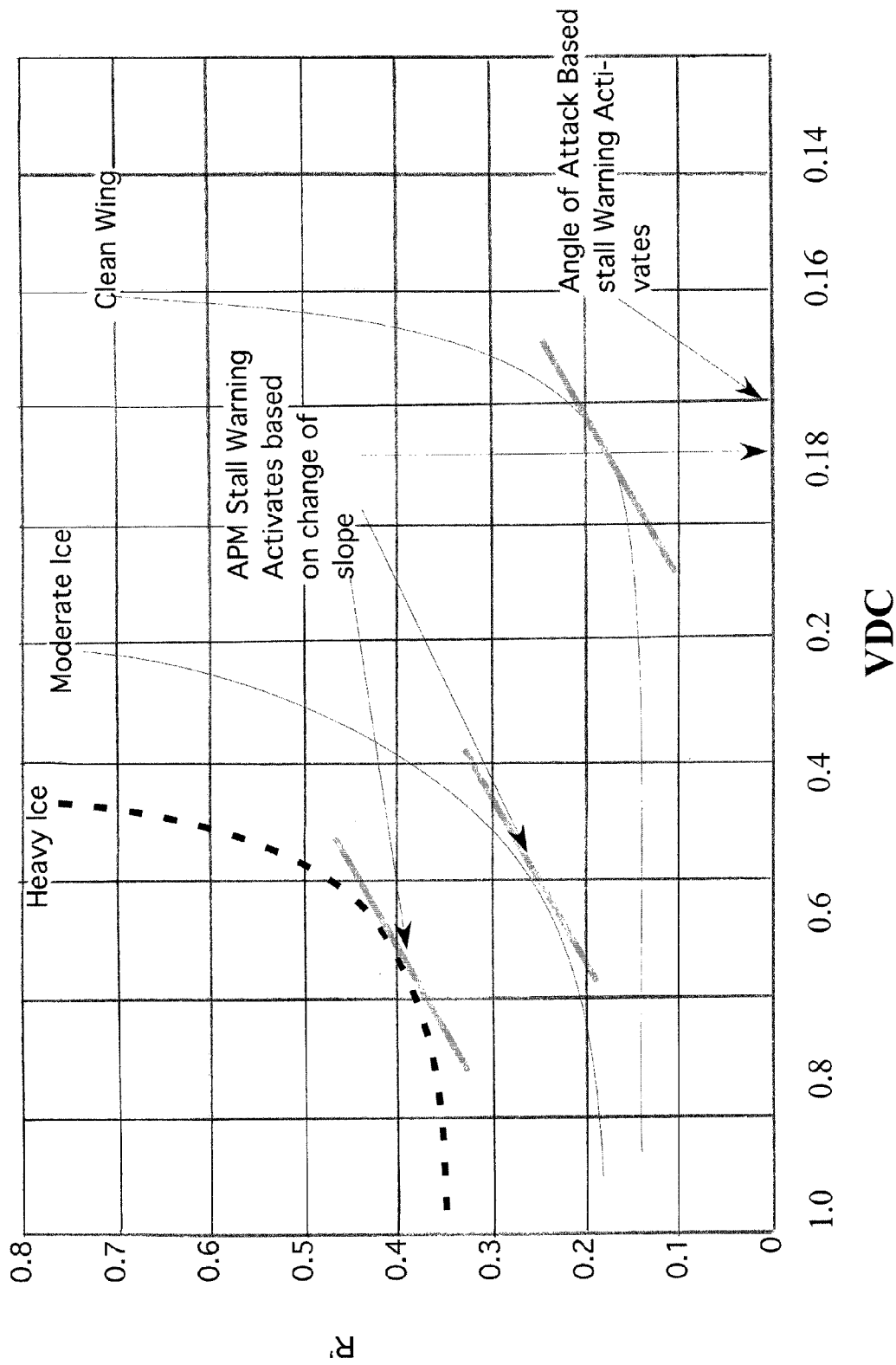
FIG. 8 is a graph illustrating three exemplary combined turbulence intensity ratios R vs. $V_{DC}$.

FIG. 8 illustrates three exemplary different curves 200, 202, and 204 of the combined turbulence intensity ratio R' vs. $V_{DC}$ where the combined turbulence intensity ratio R' itself may be a poor indicator of a stall warning. For example, in the first curve 200, which represents a case of heavy ice, the change of slope that occurs when $V_{DC}$ goes from approximately 0.6 to approximately 0.5 is high enough to trigger the APM stall warning. In this case, the combined turbulence intensity ratio R' value when this occurs is approximately 0.38. Similarly, a moderate ice case illustrated by the next curve 202 triggers the APM stall warning when $V_{DC}$ is slightly beyond 0.5 and the combined turbulence intensity ratio R' value is approximately 0.22. The clean wing case, illustrated by last curve 204, will cause a stall warning only as $V_{DC}$ goes from approximately 0.18 to approximately 0.17, with a corresponding combined R' value of approximately 0.15. If the given threshold for the combined R' were chosen to activate the stall warning with a suitable margin under heavy ice conditions, such as 0.38 for example, both a clean wing stall and a moderate ice wing stall would trigger the stall warning too late. Similarly, if the given threshold for the combined R' were chosen at 0.22, to cater for the clean wing case, then heavy ice would trigger the stall warning too early. Therefore, in this embodiment, it is not the actual combined R' value but rather the rate of change or slope of the combined R' vs. $V_{DC}$ (as illustrated in FIG. 7) that is adequate for triggering the APM stall warning. The slope of the combined R' is compared to a slope threshold and if the slope of the combined R' goes above the slope threshold, the APM stall warning is triggered.

The output signal 112 may be amplified by an amplifier before reaching the conventional presentation means 114.

In one embodiment, the processing module 106 may separate the analog output signals electrically into steady state and overlaid ripple components, and transform the overlaid ripple components into amplitude equivalents, to derive dimensionless ratios R of amplitude equivalents of the overlaid ripple components and the steady state components, to send to the combination module 110 for producing a composite R value.

Figure 9:
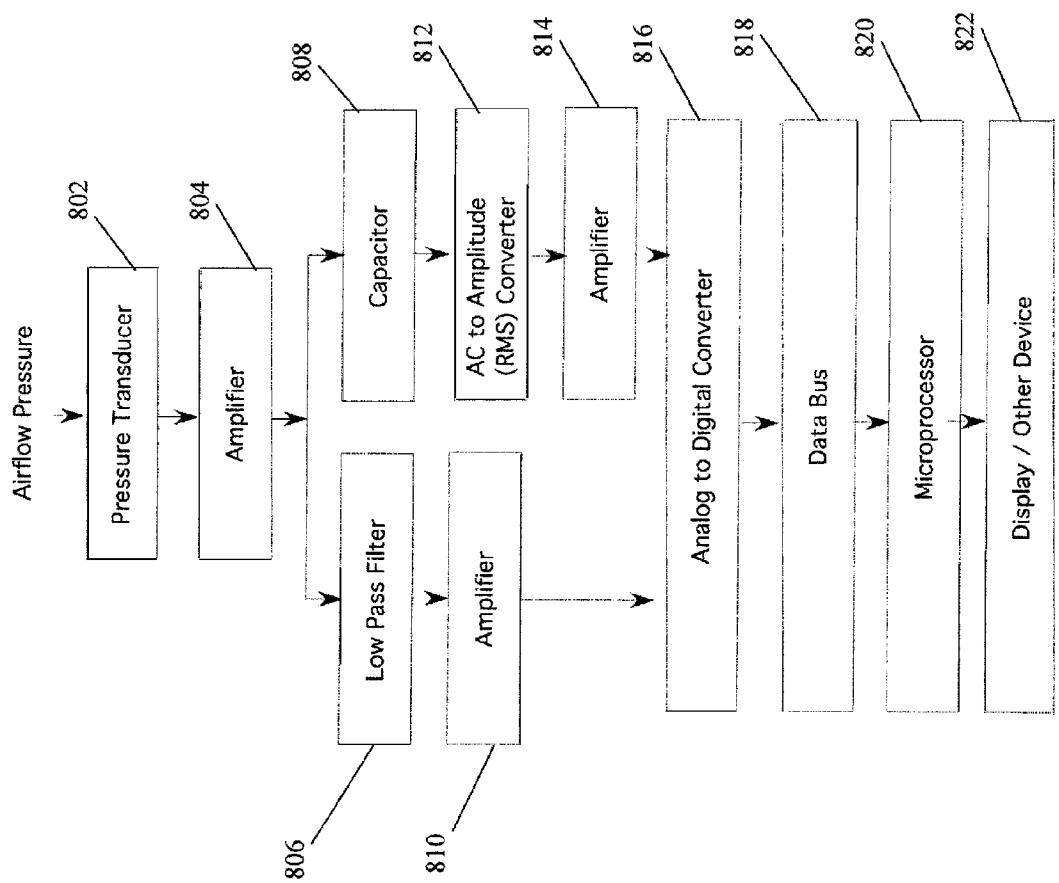
FIG. 9 diagrammatically shows analog electrical separation of the steady state and overlaid ripple components, in accordance with one embodiment.

FIG. 9 diagrammatically shows analog electrical separation of the steady state and overlaid ripple components and derivation of the pressure turbulent intensity factor. A pressure transducer 802 and an amplifier 804 process the incoming airflow pressure. Part of the signal is treated through a low pass filter 806 to isolate the steady-state or DC component of the signal outputted by the amplifier 804 and another amplifier 810 which amplifies the DC component. The other part of the signal passes through a capacitor 808, an AC to amplitude converter 812 for isolating the overlaid ripple or AC component of the signal outputted by the amplifier 804, and an amplifier 814. Both parts of the signal are then converted into a respective digital signal by the analog to digital converter 816, sent to the data bus 818, and fed into the microprocessor 820. The microprocessor 820 receives the digital AC and DC components for the measurement performed by at least two pressure transducer 802, generates a respective R value for each pressure transducer, and combines the R values to obtain a single combined turbulence intensity ratio R' which is sent to a display or other device 822.

Figure 10:
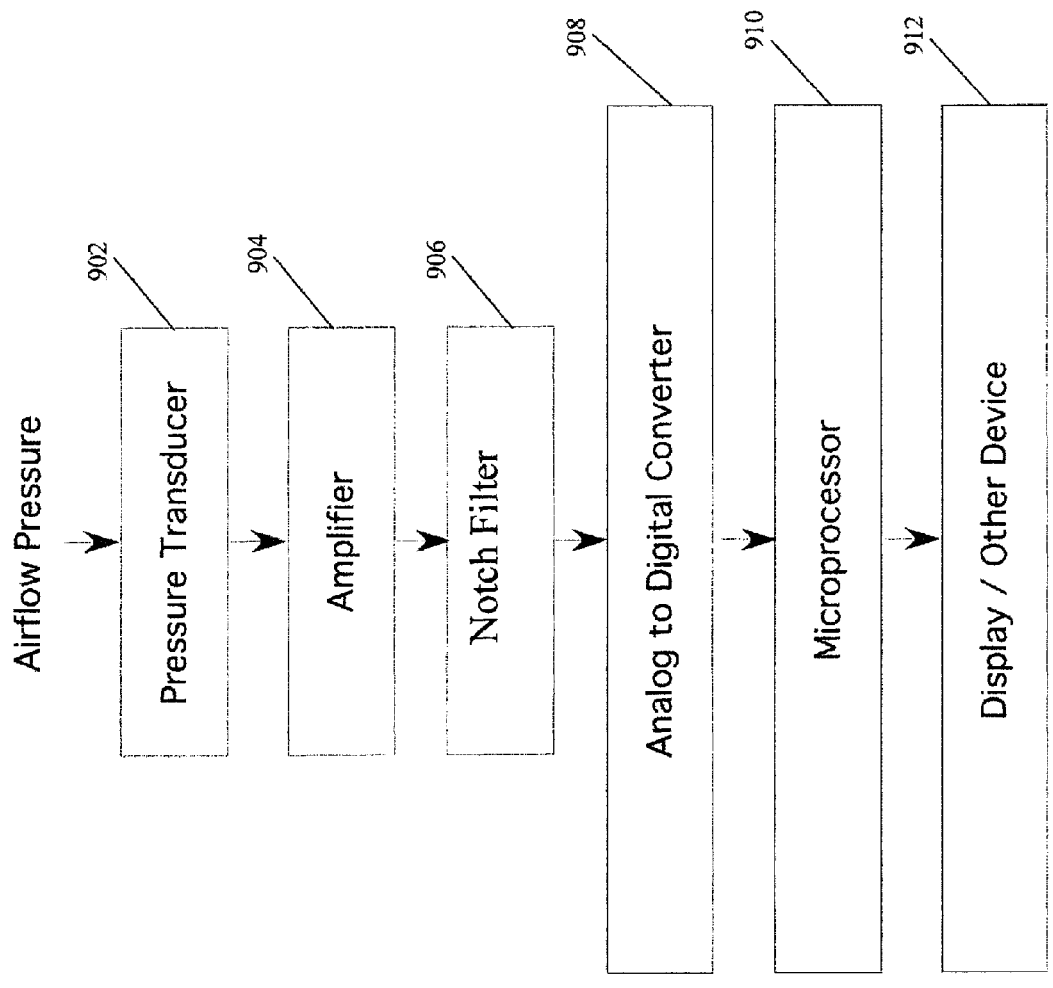
FIG. 10 diagrammatically shows digital electronic separation of the steady state and overlaid ripple component, in accordance with one embodiment.

FIG. 10 diagrammatically shows digital electronic separation of the steady state and overlaid ripple components. After conventional processing via a pressure transducer 902, an amplifier 904, and an A/D converter 908, the dedicated circuit or microprocessor 910 separates the overlaid ripple and steady-state components for signals coming from at least two pressure transducers 902, determines an R value for each pressure transducer 902, and combines the at least two R values to generate a combined turbulence intensity ratio R which is output to a display or other device 912. The microprocessor 910 may be further configured for determining the slope of the variation of the combined turbulence intensity ratio R' as a function of a normalizing parameter and comparing the slope to a threshold to output a stall warning as a function of the comparison.

In some embodiments, a notch filter 906 is used to eliminate frequencies and harmonics related to propeller effects. A lag filter implemented to smooth the display (but not the recorded data) together with two logical constraints (an air/ground sensing switch and a low speed cutoff to eliminate nuisance warnings at very low airspeeds) may also be incorporated into the apparatus. Additional filters may be applied to eliminate other undesirable frequencies, such as AC components originating from airframe induced vortices, or to transform the signal may be included using for example lead, lag, high-pass, notch and low-pass filters. The slope of the combined turbulence intensity ratio R' is output to conventional equipment, such as AoA indicators, indexer lights, AoA tone generators, stick shakers and pushers and overspeed warnings. Other conventional means either analog or digital may be employed as would be understood by those skilled in the art to indicate the combined R' value and/or to warn of limiting critical slope values.

In a further embodiment, the system for investigating airflow over the external surface of an airfoil comprises a mast for mounting on the airfoil. The mast has leading and trailing edges and a cross section of aerodynamic shape, one or more pressure transducers are mounted within the mast. The mast has an aerodynamic cross-section oriented to present a streamlined aspect to the local airflow, and is mounted perpendicularly to the airfoil being monitored, on its suction side such that the pressure transducers each be at a predetermined distance from the surface of the airfoil. For example, the mast may have an airfoil shape. In one embodiment, the mast comprises means to maintain the leading edge at constant temperature, including a heating device within the mast controlled by a temperature measuring module adjacent to the leading edge, whereby the leading edge is maintained at constant temperature.

The mast may comprise orifices in the leading edge, trailing edge, and, in some cases, perpendicular to these, with associated pressure transducers mounted therein. The orifices may be composed of an array of spaced apart orifices in the leading edge and trailing edge, at least one of the spaced apart orifices having one or more pressure transducer mounted therein. The mast additionally may comprise a base attachable to the airfoil. The pressure sensors are inclined downward and above the axis of the orifice(s) to prevent direct impingement of precipitation. Vent(s) or drain(s) and a spring-loaded cover to prevent accumulation of precipitation may also be used.

While illustrated in the block diagrams as groups of discrete components communicating with each other via distinct data signal connections, it will be understood by those skilled in the art that the preferred embodiments are provided by a combination of hardware and software components, with some components being implemented by a given function or operation of a hardware or software system, and many of the data paths illustrated being implemented by data communication within a computer application or operating system. The structure illustrated is thus provided for efficiency of teaching the present preferred embodiment.

It should be noted that the present invention can be carried out as a method, can be embodied in a system, a computer readable medium or an electrical or electro-magnetic signal. The embodiments of the invention described above are intended to be exemplary only. The scope of the invention is therefore intended to be limited solely by the scope of the appended claims.

I claim:

1. A method for generating a parameter for airfoil performance monitoring, the method comprising:
   receiving at least a first signal indicative of a first airflow parameter measured at one of an aft position and a side-facing position of a sensor mast mounted to an airfoil and at least a second signal indicative of a second airflow parameter measured at a fore position of the sensor mast;
   generating a turbulence intensity ratio for each one of the first airflow parameter and the second airflow parameter; and
   combining the turbulence intensity ratio of the first airflow parameter and the turbulence intensity ratio of the second airflow parameter to generate a combined turbulence intensity ratio for airfoil performance monitoring.

2. The method of claim 1, wherein said combining comprises summing the turbulence intensity ratio of the first airflow parameter and the turbulence intensity ratio of the second airflow parameter.

3. The method of claim 1, wherein said combining comprises determining the root mean square of the turbulence intensity ratio for the first airflow parameter and the turbulence intensity ratio of the second airflow parameter.

4. The method of claim 1, further comprising comparing the combined turbulence intensity ratio to a threshold, and outputting a stall warning signal based on the comparison.

5. The method of claim 1, further comprising determining a rate of variation of the combined turbulence intensity ratio with a normalizing parameter.

6. The method of claim 5, wherein said determining the rate of variation comprises dividing the combined turbulence intensity ratio by the normalizing parameter.

7. The method of claim 5, wherein the normalizing factor is one of an Angle-of-Attack, time, and a steady state signal component.

8. The method of claim 1, wherein said generating comprises for each one of the at least first signal and at least second signal:
- determining a steady-state component and an overlaid ripple component; and
- dividing the overlaid ripple component by the steady-state component, thereby obtaining the turbulence intensity ratio.

9. The method of claim 1, wherein the first airfoil parameter and the second airfoil parameter comprise one of an air pressure and an air speed.

10. The method of claim 1, further comprising presenting the normalized combined turbulence intensity ratio to a user.

11. A system for airfoil performance monitoring comprising:
- a processing module for receiving at least a first signal indicative of a first airflow parameter measured at one of an aft position and a side-facing position of a sensor mast mounted to an airfoil and at least a second signal indicative of a second airflow parameter measured at a fore position of the sensor mast, and generating a turbulence intensity ratio for each one of the first airflow parameter and the second airflow parameter; and
- a combination module for combining the turbulence intensity ratio of the first airflow parameter and the turbulence intensity ratio of the second airflow parameter to generate a combined turbulence intensity ratio for airfoil performance monitoring.

12. The system of claim 11, wherein the combination module is configured for summing the turbulence intensity ratio of the first airflow parameter and the turbulence intensity ratio of the second airflow parameter to generate the combined turbulence intensity ratio.

13. The system of claim 11, wherein the combination module is configured for calculating the root mean square of the turbulence intensity ratio of the first airflow parameter and the turbulence intensity ratio of the airflow airfoil parameter to generate the combined turbulence intensity ratio.

14. The system of claim 11, wherein the combination module is further configured for comparing the combined turbulence intensity ratio to a threshold and outputting a stall warning signal based on the comparison.

15. The system of claim 11, wherein the combination module is further configured for determining a rate of variation of the combined turbulence intensity ratio with a normalizing parameter.

16. The system of claim 15, wherein the combination module is configured for dividing the combined turbulence intensity ratio by the normalizing parameter to generate the rate of variation.

17. The system of claim 15, wherein the normalizing factor is one of an Angle-of-Attack, time, and a steady state signal component.

18. The system of claim 11, wherein the processing module is configured for determining a steady-state component and an overlaid ripple component, for each one of the at least first signal and at least second signal, and dividing the overlaid ripple component by the steady-state component to obtain the turbulence intensity ratio.

19. The system of claim 11, wherein the first airfoil parameter and the second airfoil parameter comprise one of an air pressure and an air speed.

20. The system of claim 11, further comprising a measuring device comprising at least a first sensor being in the fore position of the sensor mast and at least a second sensor being in said one of the aft position and the side-facing position of the sensor mast.

\* \* \* \* \*